United States Patent [19]

Faley

[11] Patent Number: 5,373,196
[45] Date of Patent: Dec. 13, 1994

[54] COMBINATION STATIC/DYNAMIC INVERTER

[75] Inventor: Brian J. Faley, Seattle, Wash.

[73] Assignee: Vanner Weldon Inc., Hilliard, Ohio

[21] Appl. No.: 962,983

[22] Filed: Oct. 16, 1992

[51] Int. Cl.$^5$ ............................................. H02J 9/06
[52] U.S. Cl. ...................................... 307/46; 307/47; 307/64; 307/68; 322/28
[58] Field of Search ................... 307/9.1, 10.1, 44–47, 307/64, 66, 68; 320/48; 322/28; 318/139–140

[56] References Cited

U.S. PATENT DOCUMENTS

| | | | |
|---|---|---|---|
| 3,769,571 | 10/1973 | Wilkinson | 321/45 R |
| 4,376,250 | 3/1983 | Baker, Jr. et al. | 307/150 |
| 4,540,930 | 9/1985 | Siedband | 322/4 |
| 4,561,059 | 12/1985 | Davis et al. | 364/477 |
| 4,916,329 | 4/1990 | Dang et al. | 307/66 |
| 4,992,920 | 2/1991 | Davis | 363/36 |
| 5,053,635 | 10/1991 | West | 307/67 |
| 5,077,652 | 12/1991 | Faley | 363/97 |
| 5,172,009 | 12/1992 | Mohan | 307/46 |

Primary Examiner—A. D. Pellinen
Assistant Examiner—Jonathan Kaplan
Attorney, Agent, or Firm—Christensen, O'Connor, Johnson & Kindness

[57] ABSTRACT

A power converter provides an AC output selectively using power from either a battery source or an alternator. The power converter includes a static converter (100) that is connected to receive DC from a battery (30), converting the DC to a relatively high frequency AC using a pulse width modulator (200). The high frequency AC is transformed to a higher voltage AC that is rectified and is used to charge a capacitor bank (104). The DC on the capacitor bank is converted to 120 (or 240) volts AC at 50/60 Hz by an inverter comprising an inverter (106) to provide power for an AC load. As the requirement for power by the AC load increases above a predefined level, a dynamic converter (24a) is energized to supply power to charge the capacitor bank in place of the static converter. The dynamic converter draws its power from a three-phase alternator (12) that includes three-phase AC output terminals connected to three-phase primary windings (140) of a transformer having a plurality of secondary windings. Secondary windings (168) produce a substantially higher voltage than the voltage from the alternator, and their output signal is rectified to charge the capacitor bank. The battery is charged with current supplied (after rectification) by secondary windings (148). Rectified DC supplied from the output of secondary windings (146) is supplied to the field winding of the alternator and controlled in response to the voltage developed across the battery terminals by rectified signal output from secondary windings (148). As the AC load draws power from the capacitor bank (through the H-bridge), the voltage of the battery charging current supplied by secondary windings (148) drops, causing a voltage regulator circuit (34) to increase the field winding current, and thereby increasing the power supplied by the alternator to compensate the greater load.

30 Claims, 6 Drawing Sheets

COMBINATION STATIC/DYNAMIC INVERTER

FIELD OF THE INVENTION

The present invention generally relates to a portable power supply, and more specifically, to a power supply selectively drawing power from a storage battery and an alternator driven by a prime mover.

BACKGROUND OF THE INVENTION

To provide a portable source of 120- or 240-volt alternating current (AC) at 50/60 Hz, an inverter can be connected to draw direct current (DC) from either the rectified output of a vehicle alternator or from a battery, converting the DC to AC and transforming it to the desired voltage level. A static inverter has been developed that provides improved conversion of DC to AC and includes a dual feedback control scheme. This improved static inverter is disclosed in U.S. Pat. No. 5,077,652, which is assigned to the same assignee as the present invention. The static inverter disclosed in this patent raises the DC from its nominal 12-volt level to a higher DC voltage level by first converting it to a high frequency AC, transforming the AC to a higher voltage level, and then converting the higher voltage AC back to DC, which is applied to charge a capacitor bank. The higher voltage DC stored in the capacitor bank is then converted to AC at 50/60 Hz with an H-bridge switching circuit. A tap on the transformer provides a low voltage AC source that is rectified to DC and supplied to charge the battery on a vehicle while the inverter is drawing power from the alternator. However, this approach, while more efficient than a conventional inverter, is still somewhat inefficient in using power generated by an alternator because of losses that occur in the internal rectifier diodes of the alternator. Each conversion between DC and AC adds to the inefficiency of the overall AC power supply. Thus, to improve the efficiency of a system for supplying AC to a load from a vehicle electrical system, unnecessary conversions should be eliminated.

The first conversion between AC and DC that occurs in a vehicular electrical system is in the alternator. The typical vehicular alternator includes internal rectifier diodes that convert the AC produced by the alternator into DC that is supplied to charge the vehicle's battery and provide power for its electrical system. For a three-phase alternator operating at 100 A DC output, the losses incurred by rectifying the AC with the internal diodes is approximately 350 watts (58 w/diode×6 diodes). Including this initial conversion that takes place within the alternator, a total of three conversions between AC and DC (or vice versa) are required to supply charging current to the battery from the prior art dynamic inverter system, when only one conversion from AC to DC should be necessary.

Conventional inverters are designed to operate with a DC input voltage and have no provision for drawing power directly from the AC produced internally by a vehicular alternator. However, there are clearly advantages in bypassing the diodes within an alternator and using the AC produced directly by the alternator as a source of power. Such a system would provide enhanced operating efficiency and be simpler, since it would eliminate the losses in the alternator diodes, which are relatively high due to the high current levels that the diodes rectify to supply power at the typical low DC output voltage of a conventional vehicular alternator. Using the AC produced by the alternator directly, without rectification, would avoid such losses. Yet there are times when it is not practical to run the vehicle's engine to drive the alternator to supply power to a dynamic inverter. For example, if an AC load driven by the inverter is relatively light, or if a prime mover used to drive the alternator can not be operated due to exhaust fumes that it would produce in an enclosed space, it would be preferable to power the AC load by inverting DC power drawn from a battery. It appears that prior art AC power supplies designed for use with a vehicle have the capability to selectively draw power either from a battery or from AC produced directly by an alternator on the vehicle. Moreover, it would be desirable for the power supply to sense the load connected and switch over from the battery source to an alternator, if the AC load exceeds a predefined level and the vehicle engine is running and available to drive the alternator.

To regulate the voltage produced by an alternator for charging a battery, a conventional voltage regulator on a vehicle senses the voltage across the battery terminals and controls the current supplied to the field windings of the alternator. However, the voltage driving the field winding current is limited to the voltage across the battery terminals, which drops as the battery is heavily loaded or discharged. When an alternator provides input power for an AC power supply, it would be preferable to provide a relatively higher DC voltage to energize the field windings to improve the efficiency of the alternator as it supplies both the power required by a connected load and the power required to recharge the battery. Accordingly, the power supply connected to the alternator should provide a source of field winding current to the regulator that is at a higher DC voltage than the field winding current normally provided by the battery.

Most conventional inverters produce a square wave or quasi-sinusoidal output wave form at 50/60 Hz. Certain loads are adversely affected by the relatively high harmonic distortion levels (45% for a square wave) present in power supplied by these inverters. It is therefor preferable to supply sinusoidal power with less than 5% harmonic distortion, to such a load, which prior art devices are incapable of providing.

The foregoing aspects and deficiencies of the prior art led to the development of the present invention, and many of the attendant advantages of this invention will become more readily appreciated as the same become better understood by reference to the following detailed description, when taken in conjunction with the accompanying drawings.

SUMMARY OF THE INVENTION

In accordance with the present invention, an electrical power system is provided for selectively converting a DC from a battery and/or an AC from an alternator driven by a prime mover, to a periodically varying electrical current. The electrical current is supplied to a load at a predefined nominal frequency and at a predefined nominal voltage. The electrical power system includes a, DC—DC (static) converter having an input that is couplable to the battery to receive the DC and an output on which a DC signal at a voltage substantially higher than that of the battery is produced. A capacitor is coupled to the output of the DC—DC converter to store power at the substantially greater DC voltage.

Further, a dynamic converter is included. The dynamic converter has a transformer with a primary winding, which is couplable to the alternator to receive an AC that the alternator produces. The transformer also has a plurality of secondary windings, of which at least one comprises a source of electrical current at a first AC voltage and another produces an electrical current at a second AC voltage that is substantially greater in magnitude than the first. A first rectifier has an input coupled to one of the plurality of secondary windings to receive the first AC voltage and an output on which a first DC voltage signal is produced that exceeds the voltage of the battery. Switch means are provided for selectively coupling the alternator to the battery to charge the battery, in response to a switch signal.

A second rectifier has an input coupled to another of the plurality of secondary windings on the transformer to receive the second AC voltage and an output on which a second DC signal is produced that is coupled to the capacitor to charge it. An inverter in the electrical power system has an input that is coupled to the capacitor to draw the power stored therein and an output couplable to the load; the inverter uses the power to produce the periodically varying electrical current at the predefined nominal frequency and predefined nominal voltage. Control means coupled to the switch means are provided for controlling the switch signal so as to decouple the alternator from the battery if the second rectifier is supplying the second DC signal to charge the capacitor.

The electrical power system further comprises load sensing means that are connected to sense a load coupled to the inverter and which produce a load sense signal indicative of the load. The control means are coupled to the load sensing means to receive the load sense signal and include means for producing a throttle control signal that is usable to control a rotational speed of the prime mover, in response to the load sense signal.

A voltage regulator that is couplable to the battery to sense its voltage is a further element of the electrical power system. The voltage regulator is also couplable to a field winding of the alternator to supply a field winding current provided by field winding source means in the dynamic converter. Field winding current from the field winding source means is at a DC voltage substantially higher than the voltage of the battery.

The control means preferably include means for determining whether the dynamic converter is energized with the AC from the alternator and whether it is supplying an electrical current at the second AC voltage to the second rectifier. If so, the control means produce the switch signal causing the switch means to decouple the alternator from the battery, enabling the first DC signal from the first rectifier to recharge the battery. The control means also include voltage sensing means for monitoring the first DC signal from the first rectifier; this first DC signal varies inversely with a load connected to the output of the inverter. In response to the load (as indicated by the first DC signal), the control means produce a field winding signal that is couplable to a field winding of the alternator to control the AC produced by the alternator.

Current sensing means are provided for monitoring an electrical current flowing from the DC—DC converter to the capacitor and producing a current indicative signal. The control means are coupled to the current sensing means to receive the current indicative signal for use in controlling the power supplied to charge the capacitor by the DC—DC converter.

The DC—DC converter preferably comprises three elements, including a pulse width modulator that modulates the DC from the battery, producing a variable pulse width modulated signal in response to a pulse width modulation signal. The second element is a transformer having a primary winding coupled to the pulse width modulator to receive the variable pulse width modulated signal and a secondary winding that develops a relatively higher voltage variable pulse width modulated signal than that applied to the primary winding. The other element is a third rectifier having an input coupled to the secondary winding to receive the relatively higher voltage variable pulse width modulated signal and an output on which the DC signal is produced, which is coupled to the capacitor. Also coupled to the pulse width modulator are the control means, which provide the pulse width modulation signal with a pulse width that is varied in response to the current indicative signal, thereby regulating the DC signal on the output of the DC-DC converter indirectly in response to a load coupled to the output of the inverter. The primary and secondary windings of the transformer comprising the dynamic converter are preferably three-phase windings, each phase of the primary windings being couplable to a different phase of a three-phase alternator to receive an AC therefrom.

The control means cause the dynamic converter to charge the capacitor with the second DC signal from the second rectifier if the load that is coupled to the output of the inverter exceeds a predefined limit, and otherwise, cause the DC—DC converter to charge the capacitor.

DETAILED DESCRIPTION OF THE PREFERRED EMBODIMENT

Structure of First Embodiment

Figure 1:
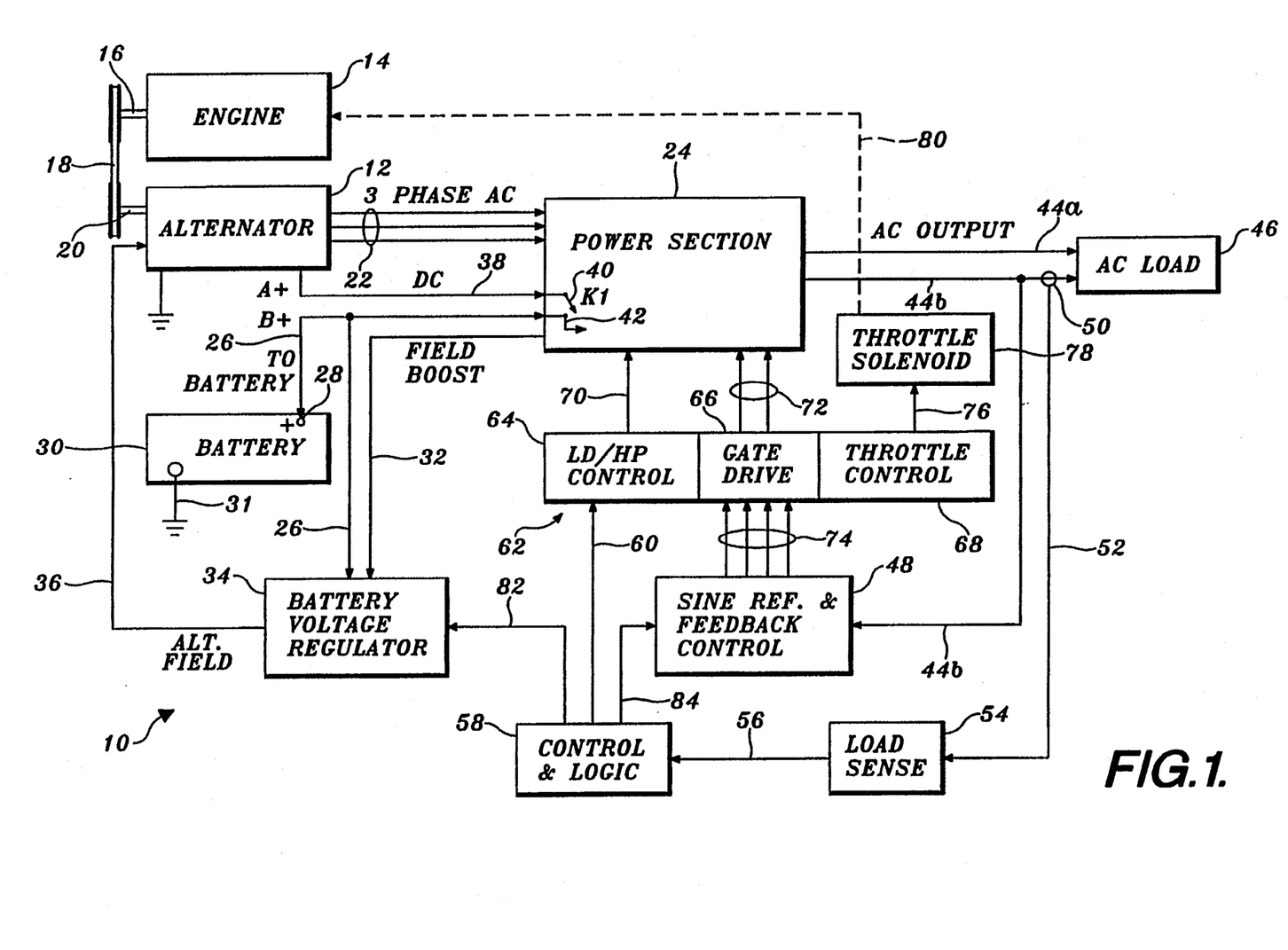
FIG. 1 is a block diagram of a first embodiment of the electrical power system in accordance with the present invention.

With reference to FIG. 1, a combination static/dynamic inverter system is generally disclosed in the form of a block diagram at reference numeral 10. Combination static/dynamic inverter system 10 is preferably installed on a vehicle on a different platform, either stationary or mobile, so as to produce alternating current (AC) at 120 volts that can be supplied to an AC load 46. The input power used to energize combination static/dynamic inverter system 10 is supplied either by a generally conventional vehicular battery 30 or as three-phase AC from an alternator 12. Alternator 12 is used to supply power when an engine 14 disposed on the vehicle or platform (not shown) is running, since the engine is a prime mover that drives the alternator. A drive shaft 16 on engine 14 is drivingly coupled through a belt 18 to a rotor shaft 20 on alternator 12. Alternator 12 differs from a typical vehicular alternator in that it includes externally accessible terminals (not shown separately) connected to the three-phase AC produced it.

The three-phase AC output from alternator 12 is conveyed through lines 22 to the input of a power section 24. Although alternator 12 also includes the conventional rectifier diodes (not shown separately) that are normally provided in a vehicular alternator, lines 22 tap the three-phase AC produced by alternator 12 before it is rectified by the diodes. However, the DC output from alternator 12 is conveyed through a line 38 to power section 24 and if a switch 40 is closed, is conveyed through a line 26 to a positive terminal 28 of battery 30 to charge the battery. The negative terminal of battery 30 is grounded by a lead 31. Line 26 is also connected to a battery voltage regulator 34 having an output that is connected through a line 36 to the field windings of alternator 12.

Under certain conditions, the voltage supplied by battery voltage regulator 34 to the field windings of alternator 12 is boosted to a level well above the voltage that could be provided by battery 30. The boosted alternator field winding voltage is developed by power section 24 and supplied to battery voltage regulator 34 over a line 32. Details of the boosted field voltage and the conditions under which it is supplied to alternator 12 are described below. When power section 24 is not supplying AC to load 46, battery voltage regulator 34 functions in a more conventional manner to provide DC to the alternator field windings at the voltage across the battery terminals.

Power section 24 uses either power derived from battery 30 or the three-phase AC from alternator 12 to produce a 120-volt AC 50/60 Hz output signal that is conveyed over lines 44a and 44b to AC load 46. In the first preferred embodiment, battery 30 is used to provide the input power to power section 24 when AC load 46 is less than a predefined limit; but if the AC load exceeds the predefined limit and alternator 12 is available to provide power, power section 24 is instead energized with the three-phase AC from alternator 12. A current sensor 50 comprising, for example, a current transformer or a shunt resistor, monitors the AC current supplied to AC load 46 by power section 24, producing a current indicative signal that is conveyed over a line 52 to a load sense circuit 54. In response to the current indicative signal, load sense circuit 54 produces a load signal that is input on a line 56 to a control and logic circuit 58.

Control and logic circuit 58 preferably comprises an eight-bit MICROCHIP ™ reduced instruction set computer (RISC), type PIC-16, which is connected by a line 60 to a control block 62. Control block 62 comprises a load/high power control circuit 64, a gate drive circuit 66, and a throttle control circuit 68. Control signals developed by load/high power control circuit 64 are carried through a line 70 to power section 24 and determine whether battery 30 or alternator 12 is used as the source of power by power section 24 to develop the AC output voltage supplied to AC load 46.

Gate drive circuit 66 is connected through lines 72 to power section 24 to provide gating signals to an inverter (not separately shown in FIG. 1) comprising part of power section 24. Gate drive circuit 66 is in turn controlled in response to signals provided over lines 74 from a sine wave reference and feedback control circuit 48. The feedback signal used by sine wave reference and feedback control circuit 48 is provided to it by line 44b, which as noted above, also conveys the AC output signal to AC load 46. Control and logic circuit 58 provides a control signal to sine wave reference and feedback control circuit 48 over a line 84. In addition, the control and logic circuit controls the battery voltage regulator 34 using a signal supplied over a line 82.

Throttle control circuit 68 can be optionally connected to engine 14 to respond to the AC load supplied power from power section 24, when alternator 12 is used as the source of the power, by controlling the speed of engine 14. Throttle control circuit 68 produces a throttle solenoid current that is supplied over a line 76 to a throttle solenoid 78, activating it so that it controls the speed of engine 14, thereby controlling the power output from alternator 12. A mechanical linkage 80 connects to the throttle (not separately shown) of engine 14 so that when throttle solenoid 78 is energized, the engine receives an increased amount of fuel, causing its speed to increase by a predefined amount above the idle speed at which it normally runs.

Figure 2:
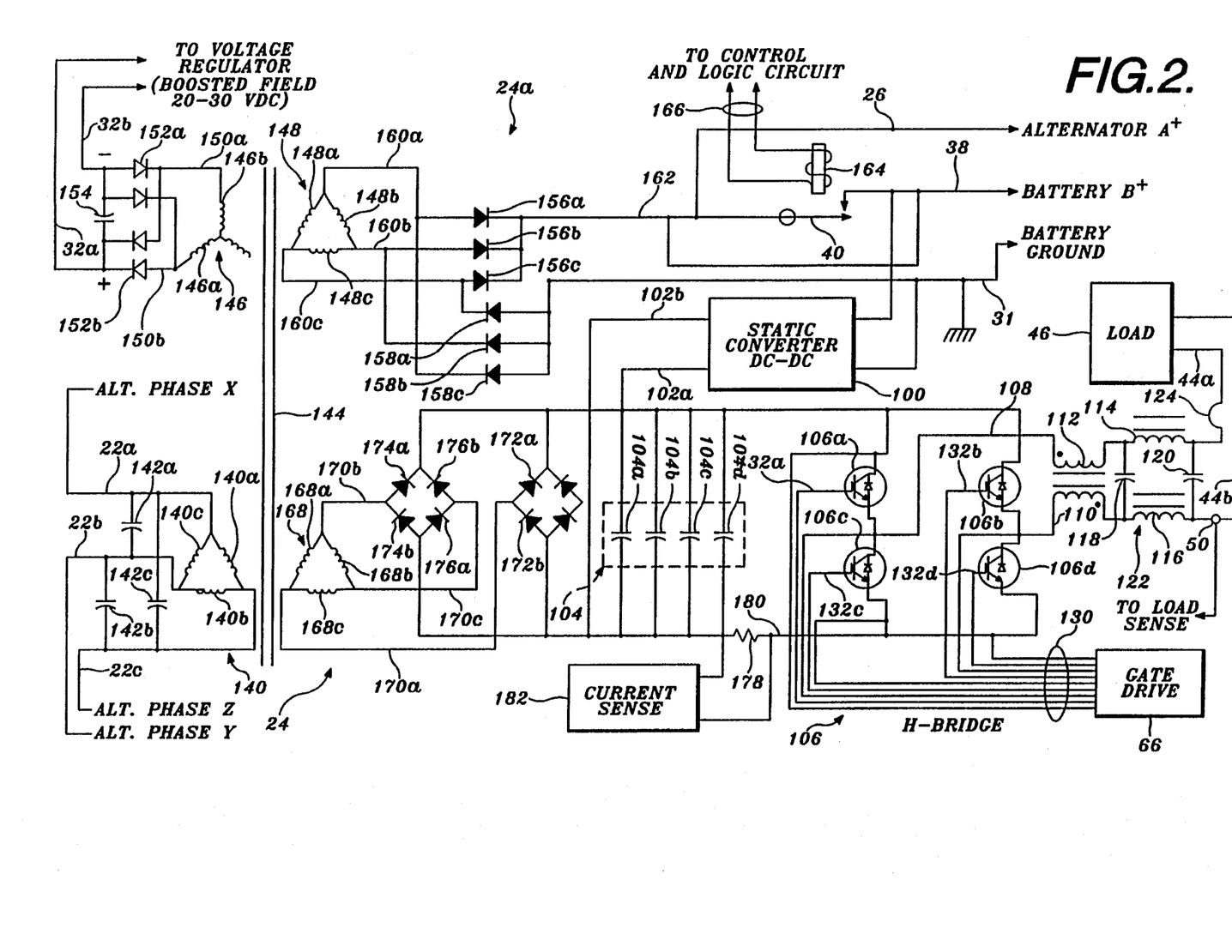
FIG. 2 is an electrical schematic diagram of the dynamic converter portion and a block diagram of the static converter comprising the electrical power system of FIG. 1.
Figure 3:
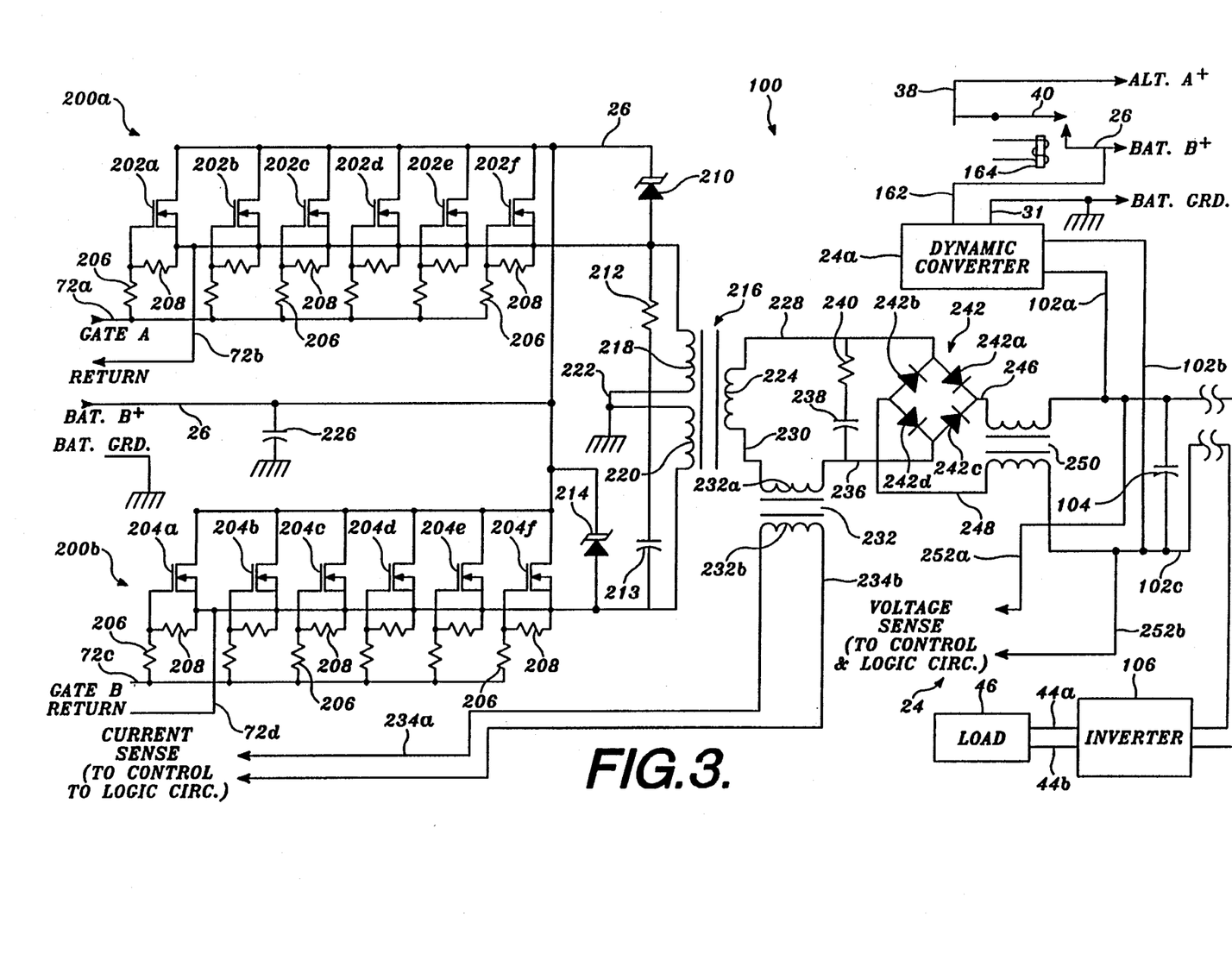
FIG. 3 is an electrical schematic diagram of the static converter portion and a block diagram of the dynamic converter portion of the electrical power system of FIG. 1.

Turning now to FIG. 2, details of power section 24 are illustrated, specifically with reference to a dynamic converter 24a, which represents the portion of the circuit supplied power from alternator 12. In addition, a static converter 100 is illustrated in a block format, to simplify the drawing in FIG. 2. Details of the static converter are shown in FIG. 3, which is discussed below. Dynamic converter 24a is so called because it operates from a variable voltage source, namely alternator 12, which has a three-phase output AC voltage that is controlled around a predefined operating point, but changes within a range, depending upon the field winding voltage. By contrast, static converter 100 is thus referenced because it is designed to operate from a DC source, specifically from the DC voltage across the terminals of battery 30, being a DC-DC converter, and variations in this voltage are relatively minimal.

Power section 24 also comprises an inverter 106. Inverter 106 preferably comprises an "H-bridge". The purpose of inverter 106 is to convert a DC to the sinusoidal AC output signal (at 50 or 60 Hz) that is supplied to AC load 46. Power section 24 further includes a capacitor bank 104, which stores charge developed by either the static converter or the dynamic converter. Capacitor bank 104 comprises a plurality of relatively large capacitors 104a–104d, each of which have a value of approximately 470 $\mu$F in the preferred embodiment; since the capacitors are connected in parallel, their combined total capacitance is approximately 1,880 $\mu$F. Of course, it will be appreciated that other values of capacitance can be used.

While static converter 100 is supplying DC to capacitor bank 104, a relay switch 40 is closed, enabling alternator 12 to provide DC rectified by its internal diodes (not separately shown) through lines 38 and 26 to charge battery 30. Relay switch 40 is controlled by a coil 164 in response to current supplied through lines 166 from control and logic circuit 58.

If engine 14 is running so that alternator 12 can supply power, and, if the load connected to combination static/dynamic inverter 10 exceeds its predefined limit, dynamic converter 24a takes over the job of maintaining the charge on capacitor bank 104 to supply power to H-bridge 106 and thus to the load, instead of static converter 100. When the change over to dynamic converter 24a occurs, control and logic circuit 58 causes relay switch 40 to open. Inverter 106 continues to convert the DC drawn from capacitor bank 104 to the 50/60 Hz AC 120-volt signal supplied to the load.

To produce the DC used to charge capacitor bank 104, the three-phase AC signal developed by alternator 12 is applied to delta connected three-phase transformer windings 140, which are inductively coupled to a plurality of secondary windings through a core 144. Lines 22a, 22b, and 22c each convey one of phases X, Y, and Z to the three common nodes of delta-connected primary windings 140a, 140b, and 140c. A capacitor 142a is connected between lines 22a and 22b, a capacitor 142b between lines 22b and 22c, and a capacitor 142c between lines 22a and 22c. The plurality of secondary windings include a Y-connected voltage regulator secondary winding 146, of which only secondary windings 146a and 146b are used. The AC voltage developed in voltage regulator secondary windings 146 is conveyed on leads 150a and 150b to the cathode of a diode 152a and the anode of a diode 152b, respectively. Lead 32b connects to the anode of diode 152a and to one side of a capacitor 154, the other side being connected to lead 32a, which is also coupled to the cathode of diode 152b. As noted above, leads 32 are connected to battery voltage regulator 34.

A delta-connected secondary transformer winding 148 comprises three secondary windings 148a, 148b, and 148c, which are used to provide charging current for battery 30. The three-phrase AC output from secondary windings 148 is full wave rectified by diodes 156 and 158, and the resulting DC is conveyed on a lead 162 to relay switch 40 and to lead 26 that is connected to positive terminal 38 on battery 30 and to one input of static converter 100. The other polarity of the full wave rectified DC output from diodes 156 and 158 is conveyed on lead 31 to ground and also to the other input to static converter 100. The specific connection of the secondary transformer windings 148 is as follows. The common node of secondary windings 148a and 148b is coupled through a lead 160a to the anode of a diode 156a and to the cathode of a diode 158c. The common node connection of secondary windings 148b and 148c is connected through a lead 160b to the anode of a diode 156b and to the cathode of a diode 158b. Similarly, the common node connecting secondary windings 148a and 148c is coupled through a lead 160c to the anode of a diode 156c and to the cathode of a diode 158a. All cathodes of diodes 156 are together connected to lead 162 and all anodes of diodes 158 are together connected to lead 31.

Another of the plurality of secondary windings inductively coupled to core 144 is a three-phase delta-connected secondary winding 168 comprises three windings 168a, 168b, and 168c that provide power used to charge capacitor bank 104 when alternator 12 is the source of the electrical power energizing the dynamic converter. A common node of secondary windings 168a and 168b is coupled through a lead 170b to the anode of a diode 174a and the cathode of a diode 174b. The common node of secondary windings 168b and 168c is likewise coupled through a lead 170c to the anode of a diode 176b and the cathode of a diode 176a; and finally, the common node of secondary windings 168a and 168c is coupled through a lead 170a to the anode of a diode 172a and the cathode of a diode 172b. Diodes 172, 174, and 176 thus comprise a full wave rectifier used to convert the three-phase AC inductively developed in secondary windings 168 to a DC voltage that is applied through leads 102a and 102b to charge capacitor bank 104. In the preferred form of combination static/dynamic inverter 10, the voltage developed by the dynamic converter to charge capacitor bank 104 is maintained at approximately 220 volts DC. Thus, the relatively lower voltage produced by alternator 12 is converted to the required higher voltage (or at least the appropriate AC voltage range for rectification to about this level of DC) by appropriate selection of the turns ratio between three-phase transformer windings 140 and secondary windings 168.

Line 102b is coupled to one side of a current sensing resistor 178 having a relatively low value of resistance, i.e., a shunt resistor, and the other side of the resistor is coupled to a line 180, which extends to the input of H-bridge 106. The voltage drop across resistor 178 is monitored by a current sensing circuit 182 that is also connected to lines 102b and 180. Current sensing circuit 182 develops a signal indicative of the current flow from capacitor banks 104 to inverter 106, which is used in controlling the combination static/dynamic inverter when static converter is being used as the source of electrical input power (instead of alternator 12). The current signal developed by current sensing circuit 182 is used as explained below in controlling the output of static converter 100.

Inverter 106 converts the DC on capacitor bank 104 to the AC output signal required by load 46. Inverter 106 comprises four insulated gate bipolar transistors (IGBTs) 106a–106d connected in series/parallel relationship as an "H-Bridge" between lines 102a and 180. Specifically, IGBTs 106a and 106c are connected in series with each other and in parallel with IGBTs 106b and 106d, which are connected in series between lines 102a and 180. The gates of IGBTs 106a–106d are connected by lines 130 to gate drive circuit 66, which provides the control signals to the gates used to selectively "turn on" each IGBT as appropriate to convert the DC voltage applied from capacitor bank 104 to AC. The AC signal developed by inverter 106 is conveyed over leads 108 and 110, which are connected to the node between IGBTs 106a and 106c, and 106b and 106d, respectively. Leads 108 and 110 are coupled to a mutual inductor 112 and to a filter 122 comprising inductors 114 and 116 and capacitors 118 and 120 that are connected between opposite ends of the inductor. A circuit breaker is installed in line 44a to provide protection against excessive current draw by AC load 46.

In FIG. 3, details of static converter 100 are illustrated in relationship to the remaining components of power section 24. Static converter 100 converts the DC voltage from battery 30 to an AC voltage and then transforms it to a higher AC voltage (nominally 200 volts DC) to charge capacitor bank 104. The DC—DC conversion from a nominal 12 volts DC on battery 30 to the nominal 200 volts DC applied to capacitor bank 104 is accomplished in static converter 100 using a pulse width modulator 200 that includes a section 200a and a section 200b. Section 200a comprises a plurality of MOSFETs 202a-202f, and similarly, section 200b comprises a plurality of MOSFETs 204a-204f.

MOSFETs 202a-202f are connected to receive gating signals over lines 72a and 72b; similarly, MOSFETs 204a-204f receive gating signals over lines 72c-72d. A plurality of resistors 206 and 208 are connected to the MOSFETs in each section 200a and 200b. Line 72a is connected to one side of one resistor 206 for each MOSFET 202, the other side of the resistor being connected to the gate of the MOSFET. The other side of each resistor 206 is also connected through one resistor 208 to the source of the MOSFET. The drain of each MOSFET in section 200a is connected through a line 26 to one side tranzorbs 210 and 214. Likewise, resistors 206 and 208 connect between line 72c and the gates/sources of MOSFETs 204. The drains of MOSFETs 204 are coupled to line 26, and thus to one side of tranzorbs 210 and 214. Line 26 is also connected to the positive terminal of battery 30 and to one side of a capacitor 226, the other side of which is connected to ground.

The sources of MOSFETs 202 are connected to one side of a primary winding 218, the opposite side of the primary winding being connected by a lead 222 to ground. In the same manner, the sources of MOSFETs 204 are connected to one side of a second primary winding 220, the other side of which is also coupled to ground through lead 222. Primary windings 218 and 220 are inductively coupled through a core 216 to a secondary winding 224, which converts the relatively high frequency AC developed as MOSFETs 202 and 204 are selectively turned on by the pulse width modulated gating signals supplied over lines 72. As a result of the turns ratio between primary windings 218 and 220 and secondary winding 224, the voltage developed across secondary winding 224 is substantially higher than that applied across the primary windings. The spike voltage across the primary windings is limited by tranzorbs 210 and 214 and high-frequency noise above the frequency range of the AC applied to the primary windings is snubbed by a resistor 212 and a capacitor 213 that are connected in series between the ungrounded sides of the primary windings. The power developed by static converter 100 is controlled by adjusting the pulse width of the pulse width gating signal, as explained further below.

Secondary winding 224 is connected through a line 228 to a full wave rectifier 242, comprising four diodes 242a-242d. Line 228 is connected to the anode of diode 242a and to the cathode of diode 242b, and in addition is connected to a resistor 240, the other end of which is connected in series with a capacitor 238. The other side of secondary winding 224 is connected through a line 230 to a current sensing transformer 232 that includes a primary winding 232a to which line 230 is connected, and a secondary winding 232b, coupled to lines 234a and 234b, which extend to a current sensing portion of control and logic circuit 58. The other end of primary winding 232a is connected through a lead 236 to capacitor 238 and to the anode of diode 242c and the cathode of diode 242d. The cathodes of diodes 242a and 242c are coupled through a line 246 to a mutual inductor 250, which is also coupled through a line 248 to the anodes of diodes 242b and 242d. The current from full wave rectifier 242 flows through mutual inductor 250 via lines 102a and 102b to charge capacitor bank 104 when the static converter is providing the power to maintain charge on capacitor bank 104. Lines 252a and 252b monitor the voltage across capacitor bank 104 and carry a signal indicative of the voltage to a voltage sensing portion of the control and logic circuit. Details of voltage regulator 34 are shown in FIG. 4, with regard to the associated components of combination static/dynamic inverter 10.

Whenever dynamic converter 24a is providing the power to maintain charge on capacitor bank 104, alternator 12 is energized. At this time, instead of charging battery 30 directly through the DC output normally provided (from the internal diodes of the alternator) through line 38 and through relay switch 40, control and logic circuit 58 activates relay coil 164, opening switch 40 so that battery 30 charges using the DC provided from diodes 156 and 158, which rectify the output of secondary transformer 148, producing about 13.6 volts DC. Lines 31 and 162 connect the charge current output of the full wave rectifier comprised of diodes 156 and 158 to battery 30.

Figure 4:
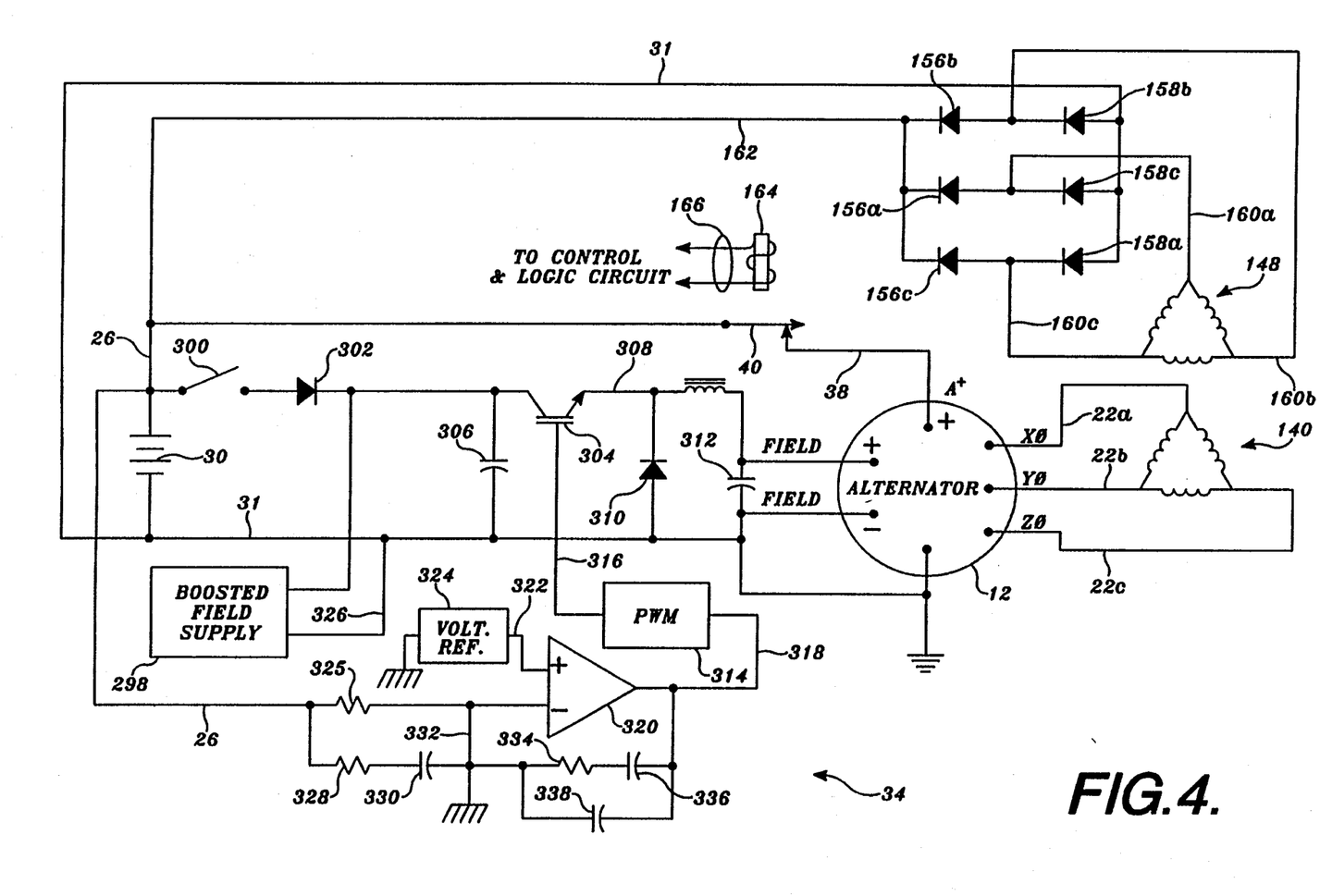
FIG. 4 is an electrical schematic diagram of the voltage regulator supplied from the dynamic converter shown in FIG. 2.

As shown in FIG. 4, a switch 300 (coupled to or part of the ignition switch for engine 14) is provided to activate combined static/dynamic inverter 10, since switch 300 must be closed in order to provide field excitation current for alternator 12. The other side of switch 300 is coupled to the anode of a diode 302, which protects against reverse polarization, which might occur, for example, if battery 30 is improperly installed. The cathode of diode 302 is connected to a collector of a transistor 304 and to one side of a capacitor 306 by lead 32a, which also connects to a boosted field supply 298 (comprising secondary transformer 146). The other side of capacitor 306 is grounded and connected through lead 326 to boosted field supply 298 and to the anode of a diode 310. The anode of diode 310 is also coupled to the negative field winding terminal of alternator 12 and to one side of a capacitor 312, which is connected between the negative and positive field winding terminals. The positive field winding terminal is connected through a lead 308 to the emitter of transistor 304 and to the cathode of diode 310.

In a conventional use of an alternator in a vehicle, the field of the alternator is excited with a voltage equal to the voltage on the vehicle's battery. However, in this preferred embodiment of the combined static/dynamic inverter, boosted field supply 298 provides a field winding current at a voltage (20-35 volts DC in the preferred embodiment) that exceeds the normal battery voltage. The resulting higher field winding current flows through the field windings of alternator 12, increasing its output power in response to an increasing AC load. The higher field winding current substantially improves the efficiency of alternator 12. The voltage supplied by the boosted field supply to the field windings of alternator 12 is determined in response to the charging voltage developed by secondary windings 148. Since secondary windings 148 are inductively coupled through core 144 to secondary windings 168, the voltage developed to charge battery 30 by secondary windings 148 is directly affected by the load applied to secondary windings 168 to maintain capacitor bank 104 at its rated voltage, which is in turn affected by AC load 46. Thus, as a function of AC load 46, the voltage developed across battery 30 by secondary winding 148 changes, providing an indication of the extent to which AC load 46 is drawing charge from capacitor bank 104 and thus, the extent to which the AC load is using power from alternator 12.

Voltage regulator 34 controls the voltage developed by alternator 12 to charge battery 30 by maintaining that voltage at least equal to a predefined level supplied by a voltage reference 324. Voltage reference 324 is coupled to an error amplifier 320 through a lead 322. Lead 26 conveys the voltage across battery 30 to a resistor 325, which is coupled in series with the other input of error amplifier 320. Connected in parallel with resistor 325 are a series-connected resistor 328 and a capacitor 330. A negative input to error amplifier 320 is also coupled to ground through a lead 332 and to a series-connected resistor 334 and a capacitor 336, which are coupled in parallel with a capacitor 338 to the output of error amplifier 320. As the voltage across battery 30 falls below the predefined voltage provided by voltage reference 324, error amplifier 320 produces a control signal output on a lead 318 that is input to a pulse width modulator 314. In response to the control voltage, pulse width modulator 314 turns on transistor 304 by applying a voltage through a lead 316 to its base. The duration over which transistor 304 is turned on is a function of the width of the pulse output from pulse width modulator 314, which is controlled in response to the voltage developed across battery 30. As the current drawn by AC load 46 increases, causing the battery charge voltage developed by secondary winding 148 to drop, voltage regulator 34 provides the boosted field supply voltage to the field windings of alternator 12 over a longer period of time so that the potential developed across capacitor 312 increases and the field winding current increases proportionally. Since the boosted field supply has an output voltage range from 20 to 30 volts DC, the power output from alternator 12 is substantially greater than it would be if the current through the field winding was provided only by battery 30. Whenever dynamic converter 24a is not in use, relay switch 40 is closed, enabling the DC output from alternator 12 to be directly applied to charge battery 30. Voltage regulator 34 continues to control the application of voltage to the field winding of alternator 12 in response to the voltage across battery 30, even when dynamic converter 24a is inactive.

Structure of Second Embodiment

Figure 5:
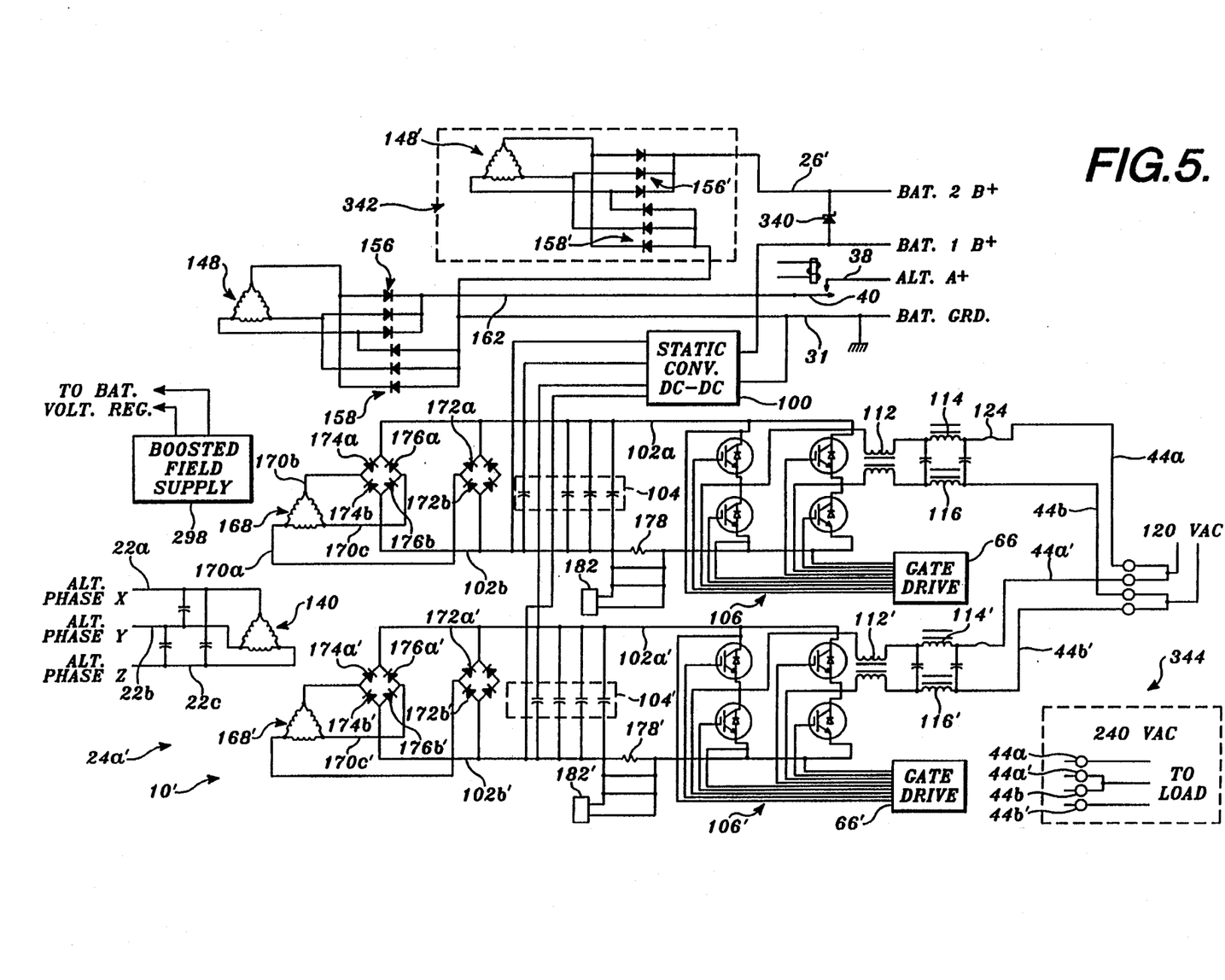
FIG. 5 is an electrical schematic diagram of a second embodiment of the electrical power system.

FIG. 5 shows a second embodiment of combination static/dynamic inverter in accordance with the present invention, generally designated by reference numeral 10'. This embodiment comprises all of the components of combination static/dynamic inverter 10, but in addition, includes a second dynamic converter 24a', which is inductively coupled to receive power from alternator 12 through secondary windings 168'. (Core 144 is omitted to simplify the drawing.) Secondary, windings 168' are delta-connected, just as secondary winding 168, and are coupled to a full wave rectifier comprising diodes 172', 174' and 176'; these diodes are connected exactly like their correspondingly numbered diodes (without a "prime" designation) that are connected to secondary winding 168. Leads 102a' and 102b' convey the DC voltage output from the full wave rectifier to charge a capacitor bank 104', so that it can provide DC power to an inverter 106' under the control of a gate drive circuit 66'. The sinusoidal AC signal output from inverter 106' passes through a mutual inductor 112' and is filtered as the current flows through inductors 114' and 116' into leads 44a' and 44b'. Leads 44a and 44a' can be selectively connected together in parallel with leads 44b and 44b' to provide higher current capacity at 120 volts AC than in the first embodiment, or alternatively, lead 44a' can optionally be connected to lead 44b so that 240 volts AC is available at the output from leads 44a and 44b', and 120 volts AC is available between leads 44a'/44b and either lead 44a or lead 44b', as shown in dash line block 344. All other aspects of combination static/dynamic inverter 10' are the same as in the first embodiment.

Optionally, combination static/dynamic inverter 10' can include an additional secondary winding 148' (inductively coupled through core 144) to transformer windings 140) having an output that is full wave rectified by diodes 156' and 158' to provide a charging current for a second battery (not shown) that is conveyed to the positive terminal of the second battery over a lead 26'. A zener diode 340 is disposed between lead 26' and lead 26 to ensure that the differential voltage between the two batteries does not exceed a predefined level. Voltage regulator 34 continues to regulate the boosted field supply or alternator DC output voltage applied to charge both batteries in this optional embodiment, by responding to the voltage across battery 30.

Operation of Combination Static/Dynamic Converter

As noted above, one of the primary advantages of the present invention is its ability to provide power to AC load 46 either from battery 30 or from alternator 12, while at the same time minimizing the number of conversions between DC and AC, and thus increasing the efficiency of the power conversion process. If AC load 46 draws a relatively light current (e.g., a load of less than 500 watts) and/or if alternator 12 is not available to provide power, the static converter in power section 100 can provide the 50/60 Hz AC to the AC load. Control and logic circuit 58 is responsive to the AC developed by secondary windings 224; which is rectified and applied to charge capacitor bank 104 based on two feedback signals. Current sensing transformer 232 develops a current feedback signal indicative of the AC produced by secondary winding 224, which is input to control and logic circuit 58. Lines 252 carry a voltage feedback signal indicative of the voltage across the capacitor bank, to control and logic circuit 58. Control and logic circuit 58 uses these two feedback signals to determine the pulse width of the gate signals applied to pulse width modulator 200, so as to control the charge current and maintain the voltage across capacitor bank 104 at approximately 200 volts DC.

The charge stored on capacitor bank 104 enables combination static/dynamic converters 10/10' to respond to transient conditions in AC load 46, e.g., to provide relatively high starting currents to an AC motor comprising AC load 46. However, as the load exceeds the capacity of the static converter, control and logic circuit 58 switches to the dynamic converter to provide DC to charge capacitor 104. At this time, the static converter ceases to supply power to AC load 46, since the dynamic converter has a greater load capacity and operates more efficiently. However, in order for dynamic converter 24a to be used to supply power to AC load 46, engine 14 must be operating and driving alternator 12.

One of the advantages of dynamic converter 24a is its use of the three-phase AC power developed by alternator 12, thereby avoiding losses in the internal diodes in the alternator that would occur if the DC power normally provided by a vehicle alternator were instead used. The three-phase AC from alternator 12 applied to primary winding 140, in a range of 30-60 volts rms, is inductively coupled to secondary windings 168 to develop the DC used to charge capacitor bank 104. Rather than directly sensing the voltage developed across capacitor bank 104 to control the output from alternator 12, battery voltage regulator circuit 34 monitors the voltage developed by the dynamic converter for charging battery 30, since that voltage reflects the magnitude of AC load 46 in terms of its affect on the current required to charge capacitor bank 104 to its nominal 220 volts DC operating voltage level. As AC load 46 draws power from capacitor bank 104 (through H-bridge inverter 106), the battery charging voltage falls, causing battery voltage regulator 34 to boost the alternator field current, increasing the power developed by alternator 12 to compensate. The alternator output voltage increases until battery voltage regulator 34 deenergizes the field winding. This cycle repeats to maintain the desired load capacity by maintaining charge on capacitor bank 104.

Instead of using static converter 100 to supply all the power for a relatively low AC load 46, it is also possible to selectively provide virtually all required power using dynamic converter 24a. In this case, the load indicative signal developed by current sensor 50 and load sense circuit 54 is used by control and logic circuit 58 to determine within three cycles of the 50/60 Hz AC when any load (e.g., greater than 5 watts) is connected to be energized by the combination static/dynamic converter, causing dynamic converter 24a to be immediately enabled to provide the power to maintain the charge on capacitor bank 104. In this case, static converter 100 is used simply to maintain the charge on the capacitor under no-load conditions, and to ensure that a minimal output current is available to detect a load. Virtually all power ever provided by the combination static/dynamic inverter is then provided by dynamic inverter 24a. During quiescent conditions, when no load is applied, the voltage feedback signal indicative of voltage across capacitor bank 104 and the current feedback signal indicative of the current supplied to maintain the charge is used by control and logic circuit 58 to control the pulse width of the pulse width modulated signal supplied to gate the MOSFETs comprising sections 200a and 200b of the pulse width modulator. This use of the static and dynamic converters is applicable to both combination static/dynamic converter 10 and 10'. Alternatively, the static converter can be used to supply power to loads less than its rated maximum, and the dynamic converter can be automatically energized to supply AC power to loads above that level in either embodiment.

In both preferred embodiments, sine wave reference and feedback control circuit 48 responds to the feedback signal provided on line 44b and compares an internally generated sine wave reference signal with this feedback signal to develop an error signal equal to the difference between the two. A square wave at a frequency greater than 20 kHz, e.g., 24 kHz, is mixed with the error signal to develop a gating signal that controls the gates of the inverter comprising inverter 106. The IGBTs of inverter 106 are gated into conduction for positive and negative cycle intervals of the desired 50 or 60 Hz wave form to produce a low distortion sine wave (once filtered by inductors 114 and 116 and capacitor 120). This sine wave output signal is produced by pulse width modulating the MOSFETs in response to a sinusoidally modulated carrier signal, which when filtered, conforms to a sine wave.

Figure 6:
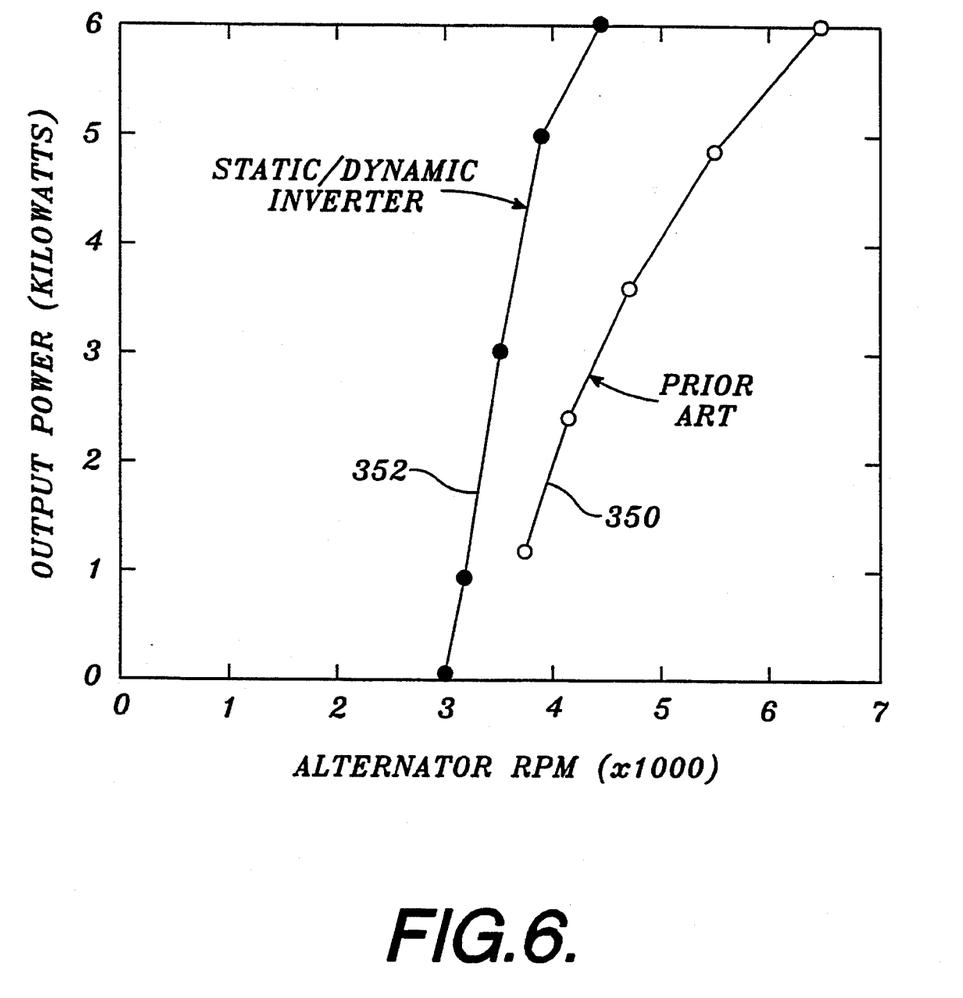
FIG. 6 is graph comparing the output power in watts from a prior art inverter and the present invention, as a function of the revolutions per minute (RPM) of alternators supplying power to the devices.

Turning now to FIG. 6, the advantages of the present invention compared to a prior art inverter is illustrated in a graph that shows output power in kilowatts as a function of alternator RPM. In FIG. 6, a line 350 represents the efficiency of a prior art inverter (not shown) that is supplied with DC from the internal diodes of a vehicle alternator. Due to the losses inherent in the internal conversion from three-phase AC to DC using the internal diodes and then a conversion back to AC at 120 volts, 60 Hz, the prior art device is much less efficient that the present invention. For example, the prior art device produces an output of only about 1200 watts when the alternator is running at approximately 3700 RPM. By comparison, as indicated by a line 352, the combination static/dynamic inverter produces approximately 4200-watts when supplied by the three-phase AC from alternator 12 when it is turning at 3700 RPM. (The alternator for the prior art inverter and the present invention have similar specifications.) Similarly, a 6 kilowatt output from the prior an device requires the alternator to turn at about 6400 RPM, whereas for the present invention, only about 4300 RPM are required to produce the same power. It should thus be evident that the present invention is substantially superior to the prior art inverter, producing a much higher output for a given RPM on the alternator.

While the preferred embodiment of the invention has been illustrated and described along with certain modifications thereto, it will be appreciated that other changes can be made without departing from the spirit and scope of the invention. Accordingly, it is not intended that the scope of this invention in any way be limited by the disclosure of the preferred embodiment, but instead, that the scope of the invention be determined entirely by reference to the claims that follow.

The embodiments of the invention in which an exclusive property or privilege is claimed are defined as follows:

1. An electrical power system for selectively converting a direct current (DC) from a battery and/or an alternating current (AC) from an alternator driven by a prime mover to a periodically varying electrical current at a predefined nominal frequency and at a predefined nominal voltage that is supplied to a load 46, comprising:
    (a) a DC—DC converter having an input that is couplable to the battery to receive the DC and an output on which a DC signal at a voltage substantially higher than that of the battery is produced;
    (b) a capacitor coupled to the output of the DC—DC converter to store power produced thereby at the substantially greater DC voltage;
    (c) a dynamic converter that includes a transformer having:
        (i) a primary winding couplable to the alternator to receive an AC that the alternator produces; and
        (ii) a plurality of secondary windings, at least one secondary winding comprising a source of electrical current at a first AC voltage, and at least another secondary winding producing electrical current at a second AC voltage that is substantially greater in magnitude than that applied to the primary winding, and substantially greater in magnitude than the first AC voltage;
    (d) a first rectifier having an input coupled to said one of the plurality of secondary windings to receive the first AC voltage and an output on which a first DC signal that exceeds the voltage of the battery is produced;

(e) switch means for selectively coupling the alternator to the battery to charge the battery, in response to a switch signal;

(f) a second rectifier having an input coupled to said other of the plurality of secondary windings to receive the second AC voltage and an output on which a second DC signal is produced that is coupled to the capacitor to charge it;

(g) an inverter having an input coupled to the capacitor to draw from the power stored therein and an output couplable to the load, said inverter producing the periodically varying electrical current at the predefined nominal frequency and predefined nominal voltage; and (h) control means, coupled to the switch means, for controlling the switch signal so as to decouple the alternator from the battery if the second rectifier is supplying the second DC signal to charge the capacitor.

2. The electrical power system of claim 1, further comprising load sensing means connected to sense a load coupled to the inverter for producing a load sense signal indicative thereof, said control means being coupled to the load sensing means to receive the load sense signal and including means for producing a throttle control signal that is usable to control a rotational speed of the prime mover, in response to the load sense signal.

3. The electrical power system of claim 1, further comprising a voltage regulator couplable to the battery to sense the voltage thereof and couplable to a field winding of the alternator, said dynamic converter including field winding source means coupled to the voltage regulator for supplying field winding current at a DC voltage substantially greater than the voltage of the battery.

4. The electrical power system of claim 1, wherein the control means include means for determining whether the dynamic converter is energized with the AC from the alternator and whether it is supplying an electrical current at the second AC voltage to the second rectifier, and wherein the control means produce the switch signal causing the switch means to decouple the alternator from the battery, enabling the first DC signal from the first rectifier to recharge the battery if:

(a) the dynamic converter is energized with the AC from the alternator; and (b) the dynamic converter is supplying an electrical current at the second AC voltage to the second rectifier.

5. The electrical power system of claim 4, wherein the control means include voltage sensing means for monitoring the first DC signal from the first rectifier, which varies inversely with a load connected to the output of the inverter, said control means producing a field winding signal that is couplable to a field winding of the alternator to control the AC produced by the alternator, in response to a load connected to the output of the inverter.

6. The electrical power system of claim 1, further comprising current sensing means for monitoring an electrical current flowing from the DC—DC converter to the capacitor and producing a current indicative signal, said control means being coupled to the current sensing means to receive the current indicative signal.

7. The electrical power system of claim 6, wherein the DC—DC converter comprises:

(a) a pulse width modulator that modulates the DC from the battery, producing a variable pulse width signal in response to a pulse width modulation signal;

(b) a transformer having a primary winding coupled to the pulse width modulator to receive the variable pulse width signal, and a secondary winding that develops a relatively higher voltage variable pulse width signal than that applied to said primary winding; and (c) a third rectifier having an input coupled to the secondary winding to receive the relatively higher voltage variable pulse width signal, and an output on which the DC signal is produced that is coupled to the capacitor.

8. The electrical power system of claim 7, wherein the control means are coupled to the pulse width modulator and provides the pulse width modulation signal with a pulse width that is varied in response to the current indicative signal, thereby regulating the DC signal on the output of the DC—DC converter indirectly in response to a load coupled to the output of the inverter.

9. The electrical power system of claim 1, wherein the primary and secondary windings of the transformer comprising the dynamic converter are three-phase windings, each phase of the primary winding being couplable to a different phase of a three-phase alternator to receive an AC therefrom.

10. The electrical power system of claim 1, wherein the control means cause the dynamic converter to charge the capacitor with the second DC signal from the second rectifier if the load coupled to the output of the inverter exceeds a predefined limit, and otherwise cause the DC—DC converter to charge the capacitor.

11. A portable power source selectively energized with DC supplied from a battery and/or electrical current from an alternator driven by a prime mover, comprising:

(a) DC-DC static converter means for converting a DC voltage supplied by the battery to a substantially greater DC voltage;

(b) dynamic AC-DC converter means for converting an AC voltage from the alternator to the substantially greater DC voltage and for producing a lower DC voltage for charging the battery, said dynamic AC-DC converter means including transformer means for inductively coupling an AC signal used to produce the lower DC voltage to an AC signal used to produce the substantially greater DC voltage, an amplitude of said lower DC voltage being therefore indicative of a load on the substantially greater DC voltage;

(c) a capacitor coupled to the DC—DC static converter means and to the dynamic AC-DC converter means to receive and store power at the substantially greater DC voltage;

(d) inverter means coupled to the capacitor, for drawing on the power stored therein and producing an AC power signal to energize a load; and (e) control means, coupled to the dynamic AC-DC converter means to receive the lower DC voltage, for producing a field winding signal to control the AC voltage from the alternator in response to the lower DC voltage and including switch means for selectively decoupling the battery from the alternator if the dynamic AC-DC converter is energized and is supplying DC to the capacitor.

12. The portable power source of claim 11, wherein the DC—DC static converter means comprise:
(a) a pulse width modulator that produces a pulse modulated signal having a variable pulse width, said variable pulse width being determined in response to a pulse width control signal;
(b) a transformer having a primary winding coupled to the pulse width modulator to receive the pulse modulated signal, and a secondary winding for producing a pulse modulated signal having a substantially higher voltage than that applied to said primary winding; and
(c) a rectifier having an input coupled to the secondary winding of the transformer to receive the relatively higher voltage pulse modulated signal present thereon, and an output on which a corresponding DC signal is produced, said output being coupled to the capacitor so that the DC signal charges the capacitor.

13. The portable power source of claim 12, further comprising a current transformer to monitor the current flowing from the rectifier to the capacitor and producing a current indicative signal, said control means being coupled to the current transformer to receive said current indicative signal.

14. The portable power source of claim 13, wherein the control means produce the pulse width control signal in response to the current indicative signal, to regulate the substantially greater DC voltage produced by the DC—DC static converter means in response to a variable load on the inverter means.

15. The portable power source of claim 14, wherein the control means vary the pulse width of the pulse width modulator with the pulse width control signal so as to maintain the DC supplied by the DC-DC static converter means to charge the capacitor, at a predefined level.

16. The portable power source of claim 11, wherein the dynamic AC-DC converter comprises a plurality of rectifiers and wherein the transformer means comprise a three-phase primary winding and at least two three-phase secondary windings, the secondary windings being coupled to the plurality of rectifiers, which are connected in a plurality of bridge circuits, the bridge circuits producing the relatively higher and lower DC voltages by rectifying AC from the secondary windings.

17. The portable power source of claim 16, further comprising voltage regulator means coupled to the dynamic AC-DC converter means to receive a voltage substantially greater than that on the battery therefrom, and couplable to a field winding of the alternator, for supplying a DC current to the field winding of the alternator, said voltage regulator means including voltage sensing means couplable to the battery, for sensing the voltage thereon, said voltage regulator means regulating a DC voltage supplied to the battery from the dynamic AC-DC converter means in response to the voltage on the battery.

18. The portable power source of claim 11, wherein the control means selectively cause the dynamic AC-DC converter means to charge the capacitor if the prime mover is driving the alternator, and otherwise, cause the DC—DC static converter means to charge the capacitor, thereby giving preference to energizing the load with power from the dynamic AC-DC converter means if it is available and if the inverter means are supplying more than a predefined level of an AC to a load coupled thereto.

19. The portable power source of claim 11, further comprising means for sensing a load on the inverter means and producing a load indicative signal that is coupled to the control means, wherein if the capacitor is being charged by the dynamic AC-DC converter means, the control means produce a throttle control signal as a function of the load indicative signal, said throttle control signal being used to control a rotational speed of the prime mover and thus the AC voltage that is input to the dynamic AC-DC converter means from the alternator.

20. The portable power source of claim 11, further comprising means for sensing the voltage across the capacitor and producing a capacitor voltage indicative signal that is coupled to the control means, wherein the control means energize the DC—DC static converter means to charge the capacitor if the capacitor voltage indicative signal falls below a predefined level, indicating that a load capacity of the dynamic AC-DC converter means has been exceeded.

21. The portable power source of claim 11, wherein the inverter means comprise a pulse width modulated H-bridge having a positive half cycle portion and a negative half cycle portion, said control means providing a varying pulse width signal that comprises a plurality of gating pulses having successively varying widths, for gating the positive and negative half cycle portions of the pulse width modulated H-bridge into conduction, so as to substantially define a sinusoidal wave form for the AC power signal produced by the inverter means.

22. The portable power source of claim 21, wherein the control means further comprise a reference sine wave source that produces a reference sine wave, and wherein the inverter means include feedback means for producing a feedback signal indicative of an amplitude of the AC power signal, said control means including comparator means for comparing the reference sine wave with the feedback signal and producing an error signal indicative of any difference between the feedback signal and the reference sine wave, said control means varying the width of the gating pulses so as to minimize the difference.

23. A power supply selectively energized with DC supplied from a battery and/or electrical current from an alternator driven by a prime mover, comprising:
(a) DC—DC static converter means for convening a DC voltage supplied by the battery to a first substantially greater DC voltage;
(b) dynamic AC-DC converter means for converting an AC voltage from the alternator to a second substantially greater DC voltage and for producing a lower DC voltage for charging the battery, said second greater DC voltage exceeding said first greater DC voltage from the DC—DC static converter means;
(c) a capacitor coupled to the DC—DC static converter means and to the dynamic AC-DC converter means to receive and store power at either the first or second greater DC voltages;
(d) inverter means coupled to the capacitor, for drawing on the power stored therein and producing an AC power signal to energize a load;
(e) load sensing means for sensing a load coupled to the inverter means and producing a signal indicative of said load; and (e) control means, coupled to the dynamic AC-DC converter means, the DC—DC static converter means, and to the load sensing means to receive the signal indicative of said load, for selectively energizing the dynamic AC-DC converter means if:
  (i) a prime mover is rotatably driving an alternator that is coupled to the AC-DC converter means; and
  (ii) the signal indicative of load exceeds a predefined level, said control means otherwise selectively energizing the DC-DC static converter means to supply power to a load connected to the inverter.

24. The power supply of claim 23, wherein the load sensing means comprise a current sensor connected to an output of the inverter means so that current supplied to a load passes through the current sensor.

25. The power supply of claim 23, wherein the DC-DC static converter means comprise:
  (a) a pulse width modulator that produces a variable pulse width signal in response to a pulse width modulating signal;
  (b) a transformer having a primary winding coupled to the pulse width modulator to receive the variable pulse width signal and a secondary winding that produces a relatively higher voltage variable pulse width signal; and
  (c) a rectifier coupled to the secondary winding to receive the relatively higher voltage variable pulse width signal, converting it to the first substantially greater DC voltage.

26. The power supply of claim 25, wherein the control means provide the pulse modulating signal to the pulse width modulator and thus control the pulse width modulator.

27. The power supply of claim 26, further comprising means for sensing the voltage on the capacitor and producing a signal indicative thereof, said control means being coupled to the means for sensing the voltage to receive said signal and controlling the pulse width modulator in response thereto.

28. The power supply of claim 23, further comprising a voltage regulator couplable to the battery to sense its voltage and couplable to a field winding of an alternator to supply a field winding current thereto in response to the voltage on the battery, wherein said dynamic AC-DC converter means include field current means for generating a field current that is supplied to the voltage regulator for application to the field winding of the alternator, said field current being at a substantially higher voltage than the voltage on the battery to improve the efficiency with which the alternator produces the AC coupled to the dynamic AC-DC converter means.

29. The power supply of claim 23, wherein the control means further comprise throttle control means couplable to a throttle to control a rotational speed of a prime mover used to drive an alternator in response to the lower DC voltage produced by the dynamic AC-DC converter means, which is indicative of a load connected to the inverter means, said throttle control means thus controlling the rotational speed of a prime mover driving an alternator in response to the load.

30. The power supply of claim 23, wherein the inverter means include feedback means for generating a feedback signal indicative of a wave form and amplitude of the AC power signal, and wherein the control means include reference means for generating a reference sine wave, and means coupled to the feedback means to receive the feedback signal and to the reference means to receive the reference signal, for comparing the feedback signal to the reference signal to produce an error signal as a function of any difference between the two, and thereby controlling the inverter means in response to the error signal so as to minimize the error signal, said AC power signal thus generally defining a sine wave.

* * * * *